Feb. 7, 1933.  A. H. LEAMY  1,896,797
RUNNING BOARD FOR AUTOMOBILES
Filed July 24, 1929   2 Sheets-Sheet 1
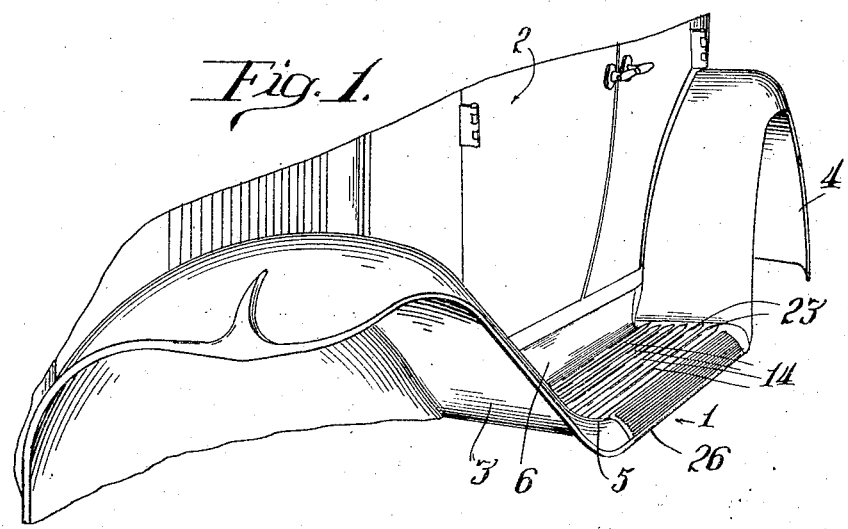
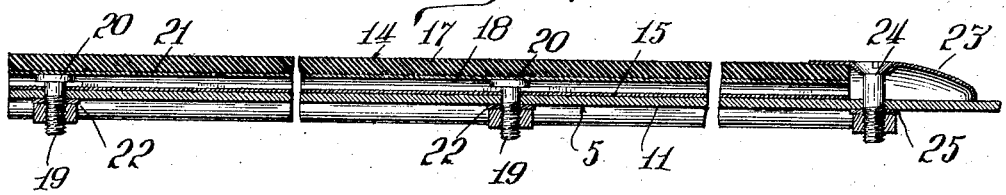
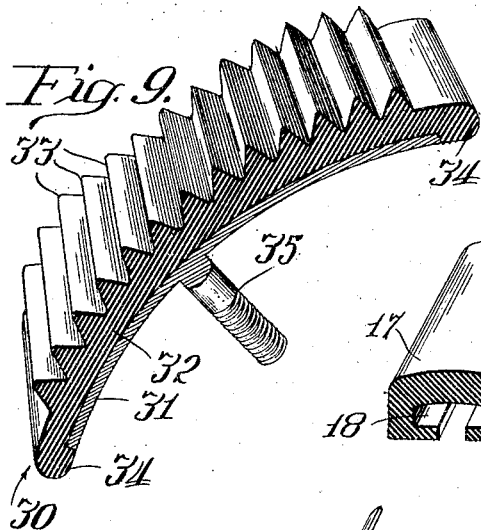
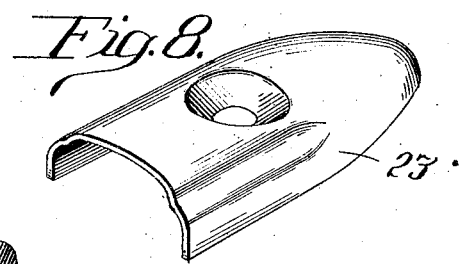
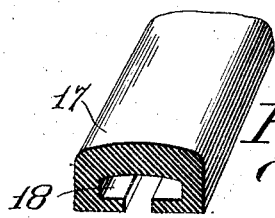
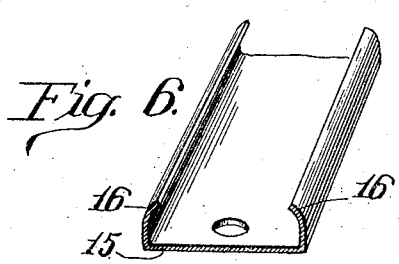
Inventor
Alan H. Leamy
By Arthur ... Nelson
Attorney Feb. 7, 1933.   A. H. LEAMY   1,896,797
RUNNING BOARD FOR AUTOMOBILES
Filed July 24, 1929   2 Sheets-Sheet 2
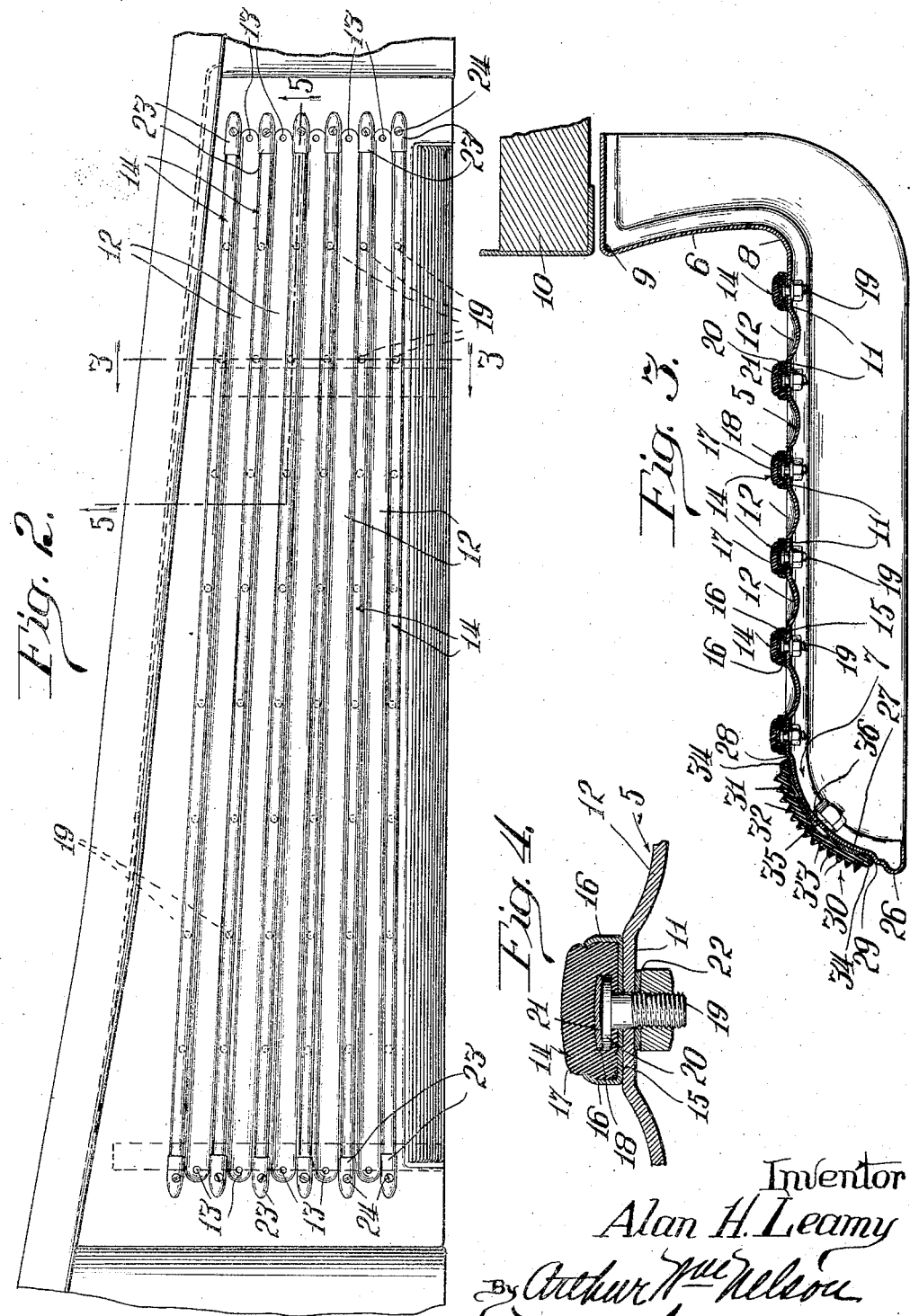
Inventor
Alan H. Leamy
By Arthur W. Nelson
Attorney.

Patented Feb. 7, 1933

1,896,797

UNITED STATES PATENT OFFICE

ALAN H. LEAMY, OF AUBURN, INDIANA, ASSIGNOR TO MANNING & CO., OF CHICAGO, ILLINOIS, A CORPORATION OF ILLINOIS

RUNNING BOARD FOR AUTOMOBILES

Application filed July 24, 1929. Serial No. 380,508.

This invention relates to improvements in running boards for automobiles and it consists of the matters hereinafter described and more particularly pointed out in the appended claims.

The primary object of the invention is to provide an improved running board for automobiles wherein the valance is formed integrally with the step and the usual crevices between the two wherein rust as well as squeaks first originate are eliminated.

Another object of the invention is to provide a structure of this kind wherein individual tread strips are employed on the step instead of the usual mat and said strips are separated by grooves having openings therein for drainage purpose.

Another object of the invention is to provide a running board of this kind wherein the front marginal portion of the step includes a scuff strip of material different from the step itself, which prevents the foot from slipping in stepping up the running board as when entering or leaving the automobile.

These objects of the invention, as well as others, together with the many advantages, will more fully appear as I proceed with my specification.

In the drawings:—

Fig. 1 is a perspective view of a running board embodying my invention in the position it occupies with reference to adjacent parts of an automobile.

Fig. 2 is a top plan view of the improved running board on an enlarged scale.

Fig. 3 is a transverse vertical sectional view through the same on an enlarged scale as taken on the line 3—3 of Fig. 2.

Fig. 4 is a detail transverse vertical sectional view on an enlarged scale, through one of the tread strips shown in Fig. 3.

Fig. 5 is a longitudinal sectional view through one end of one of said tread strips and associated running board parts as taken on the line 5—5 of Fig. 2.

Fig. 6 is a perspective detail sectional view of the tread strip container.

Fig. 7 is a perspective detail sectional view of the rubber tread strip employed in the container of Fig. 6.

Fig. 8 is a perspective view of a tread strip finishing cap employed in my improved running board.

Fig. 9 is a perspective detail sectional view of a scuff strip employed in my improved running board.

Referring now in detail to that embodiment of the invention illustrated in the accompanying drawings, 1 indicates as a whole my improved running board, 2 the body of an associated automobile, 3 the front fender and 4 the rear fender thereof. The fender as shown herein is the one associated with the left hand side of an automobile and it will be understood that the running board associated with the right hand side of the automobile will be the same with the exception of a different relative position of the parts thereof.

The running board in itself as a whole is made from a single piece of sheet metal and comprises a horizontally disposed step 5 with an upright valance 6 along the inner side thereof and with a downwardly curved marginal apron 7 along the outer side thereof. When viewed in plan the step of the running board is wider at its front end than it is at the rear end and the valance follows the sill line of the body throughout its length as best shown in Fig. 2. The valance though upright is not truly perpendicular but is directed inwardly and downwardly from its top to merge into the step by a generously rounded corner 8 as best shown in Fig. 3 to eliminate any seams or crevices at this point. The top margin of the valance is provided with a horizontal flange 9 which while disposed beneath the body sill 10 is spaced therefrom. As the method of supporting the running board from the chassis of the automobile as well as the manner in which the ends of the running board are secured to the fenders follow general automobile practice the same is neither illustrated nor described in detail.

In the step 5 of the running board is provided a plurality of longitudinally extending, flat tread strip supporting bands 11 spaced apart by means of shallow depressions or grooves 12. As best shown in Fig. 2, said depressions or grooves which terminate short of the ends of the step, are wider at their front ends than they are at their rear ends. In the ends of each depression or groove 12 are formed drain openings 13.

On each tread strip supporting band 11 is a tread strip indicated as a whole by the numeral 14. Each tread strip comprises a channel like, metallic container having a bottom wall 15 of a width approximately that of the band upon which it engages, and inwardly turned side walls 16—16. As best shown in Figs. 4 and 6, the top edges of said side walls form a contracted inlet mouth or slot for each container. In each container is located a tread strip proper 17 preferably made of rubber and having a substantially T-shaped groove 18 opening through its bottom surface. When the strip 17 is in its associated container it is somewhat compressed laterally so that portions thereof cover up or bulge over the edges of the side walls of the container as best shown in Fig. 4.

To secure the tread strip in the container as well as to secure each container to the associated band portion 11 of the step I provide a plurality of bolts 19 having flat heads 20 disposed in the larger top part of the groove in each strip 17 and in said part of the groove above the heads of all bolts associated therewith a protector strip 21 of metal. This strip prevents the bolt head from cutting through the rubber strip 17. Said bolts extend down through suitable openings in the bottom wall 15 of the container or channel as well as through the associated band portion 11 to there receive a nut and associated washer 22. When the nut is screwed up tight, the several associated parts are securely held together without the danger of becoming loose with resulting rattling. To finish off the ends of the strip, I provide a cap 23 which covers the ends of both the strips 17 and container or channel, which cap is secured in place by a screw 24 and associated nut and washer 25 as best shown in Fig. 5.

The apron 7 of the step is curved on an arc of generous radius and terminates at its bottom or free margin in an inturned finishing bead 26. The mid-portion of said apron is depressed as to form a transversely curved seat 27 with longitudinally extending, parallel, top and bottom or inner and outer shoulders 28 and 29 respectively.

Disposed on said seat is a pad or scuff strip indicated as a whole by the numeral 30. This pad or scuff strip comprises a metallic base plate 31 transversely curved to fit upon the seat 27, and a covering of rubber 32 vulcanized thereto. Said covering is longitudinally corrugated along its top surface as at 33 and its margins 34 which project laterally beyond the margins of the base plate 31 engage against the shoulders 28—29 of the apron. On the inner curved face of the base plate, are longitudinally spaced studs 35 which extend through suitable holes in the apron and receive associated nuts and washers 36. When the said nuts are drawn up tight the pad or scuff strip is securely attached to said apron.

The many advantages of my improved construction are apparent to those familiar with the art. By means of an integral valance which joins the step by a rounded corner, I am enabled to eliminate the unsightly crack or crevice heretofore present at the meeting line of the step and valance which was indeed objectionable not only because of the squeaks which there develop but also because it is favorable to rust formations.

With the tread strip arranged as described, slippage in entering and leaving the automobile is eliminated and no water can accumulate on the board in the plane of the tread surfaces because of the grooves between said strips and from which water readily drains. Again such a structure provides a corrugated effect for the step which materially stiffens the same and prevents vibration.

With the apron covered by a pad as described, a roughened, yielding surface is provided which not only provides a finishing trim for the board but also prevents scuffing and marking of the board as well as slipping when entering or leaving the automobile.

While in describing my invention, I have referred in detail to the form construction and arrangement of the several parts thereof, the same is to be considered merely as illustrative so that I do not wish to be limited thereto except as may be specifically set forth in the appended claims.

I claim as my invention:—

1. A running board for automobiles embodying therein a one piece sheet metal step portion having longitudinal band portions formed therein and separated from each other by grooves having drainage openings therein, and antislip tread members fixed upon said band portion.

2. A running board for automobiles embodying therein a one piece sheet metal step portion, having longitudinally extending, transversely spaced band portions formed therein, retaining members on said band portions, tread strips disposed in said retaining members and means for securing the retaining members to the band portions which means is partly embedded in the tread strips.

3. A running board for automobiles embodying therein a step portion, longitudinally extending, transversely spaced, retaining members on said step portion, tread strips disposed in said retaining members and a finishing member enclosing the end of each retaining member and tread strip and secured to said step portion.

4. A running board for automobiles embodying therein a step portion, having longitudinally extending, laterally spaced band portions separated by grooves formed therein, tread strips, a retaining member for each tread strip engaged upon each band portion and means engaging the tread strip and extending through said retaining member and band portion for securing the same to said step.

5. A running board for automobiles embodying therein a step portion, having longitudinally extending, laterally spaced band portions separated by grooves formed therein, tread strips, a retaining member for each tread strip engaged upon each band portion, bolts engaging each tread strip and extending through the retaining member and band portion therefor for securing the same to the step portion and a protecting strip disposed between the heads of said bolts associated with each tread strip and said tread strip.

6. A running board for automobiles embodying therein a step portion having a valance integral with one side thereof and an apron along the other side thereof, individual spaced tread members secured to said step portion between said valance and apron and a pad secured to said apron.

7. A running board for automobiles embodying therein a step portion, a valance portion integral with one side of the step portion and extending upwardly therefrom, an apron associated with the other side of the step portion and extending downwardly therefrom, the step portion having longitudinally extending raised band parts separated by shallow grooves provided with drainage openings therein and a tread strip disposed upon each band portion and secured thereto by means opening only through the bottom portion of said tread strip.

8. A running board for automobiles embodying therein a step portion, a valance portion integral with one side of the step portion and extending upwardly therefrom, an apron integral with the other side of said step portion and curved downwardly therefrom, the step portion having longitudinally extending raised band parts separated by shallow grooves provided with drainage openings therein and a tread strip disposed upon each band portion and secured thereto by means opening only through the bottom portion of each tread strip.

9. A running board for automobiles embodying therein a step portion having a curved apron along one margin and which apron includes inner and outer longitudinal shoulders, a base plate conforming to said curved apron between said shoulders and carrying studs extending through said apron and a strip member of yielding material vulcanized to said base plate and being of a width approximating the distance between said shoulders and means associated with the studs for securing the base plate to the apron.

In testimony whereof, I have hereunto set my hand, this 17th day of July, 1929.

ALAN H. LEAMY.